(12) United States Patent
Rukavina et al.

(10) Patent No.: US 9,744,747 B2
(45) Date of Patent: Aug. 29, 2017

(54) WINDOW INTERLAYER WITH SOUND ATTENUATION PROPERTIES

(75) Inventors: Thomas G. Rukavina, New Kensington, PA (US); Gregory J. McCollum, Gibsonia, PA (US)

(73) Assignee: Vitro, S.A.B. de C.V., Nuevo León (MX)

(*) Notice: Subject to any disclaimer, the term of this patent is extended or adjusted under 35 U.S.C. 154(b) by 1739 days.

(21) Appl. No.: 11/652,751

(22) Filed: Jan. 12, 2007

(65) Prior Publication Data

US 2008/0171198 A1 Jul. 17, 2008

(51) Int. Cl.
| | |
|---|---|
| *C08G 18/00* | (2006.01) |
| *B32B 17/10* | (2006.01) |
| *C08G 18/40* | (2006.01) |
| *C08G 18/42* | (2006.01) |
| *C08G 18/48* | (2006.01) |
| *C08G 18/66* | (2006.01) |
| *C08G 18/71* | (2006.01) |
| *C08G 18/75* | (2006.01) |
| *C09J 175/08* | (2006.01) |

(52) U.S. Cl.
CPC .... *B32B 17/1077* (2013.01); *B32B 17/10036* (2013.01); *B32B 17/10321* (2013.01); *B32B 17/10917* (2013.01); *C08G 18/4018* (2013.01); *C08G 18/4277* (2013.01); *C08G 18/4854* (2013.01); *C08G 18/6674* (2013.01); *C08G 18/718* (2013.01); *C08G 18/758* (2013.01); *C09J 175/08* (2013.01); *C08G 2120/00* (2013.01); *C08G 2190/00* (2013.01); *Y10T 428/269* (2015.01); *Y10T 428/31551* (2015.04)

(58) Field of Classification Search
USPC ........ 528/44, 59, 60, 65, 66, 77, 78, 80, 85; 428/423.1, 425.6, 339; 156/331.7, 331.4, 156/99, 246
See application file for complete search history.

(56) References Cited

U.S. PATENT DOCUMENTS

| | | | | |
|---|---|---|---|---|
| 3,620,905 A | * | 11/1971 | Ahramjian | 428/425.6 |
| 4,085,092 A | * | 4/1978 | Chang et al. | 528/80 |
| 4,584,229 A | * | 4/1986 | Bourelier et al. | 428/216 |
| 4,652,494 A | * | 3/1987 | Bravet et al. | 428/423.1 |
| 4,671,838 A | * | 6/1987 | Bravet et al. | 156/246 |
| 4,784,916 A | * | 11/1988 | Bravet et al. | 428/423.1 |

(Continued)

FOREIGN PATENT DOCUMENTS

| | | | | |
|---|---|---|---|---|
| EP | 356027 A1 | * | 2/1990 | C08K 13/02 |
| EP | 1254916 A2 | | 11/2002 | |

(Continued)

OTHER PUBLICATIONS

U.S. Appl. No. 11/652,748, filed Jan. 12, 2007, Rukavina.
U.S. Appl. No. 11/652,749, filed Jan. 12, 2007, Rukavina.
U.S. Appl. No. 11/652,750, filed Jan. 12, 2007, Rukavina.

*Primary Examiner* — Michael L Leonard
(74) *Attorney, Agent, or Firm* — Andrew C. Siminerio

(57) ABSTRACT

The present invention discloses a method for forming a laminated window. The method includes: a) assembling a mold between two plies that make up a laminated window; b) filling the mold with a reaction mixture having: (1) at least one chain extender; (2) at least one polyether polyol having a molecular weight of approximately 1,000; and (3) at least one aliphatic polyisocyanate; and c) curing the reaction mixture.

25 Claims, 2 Drawing Sheets

(56) References Cited

U.S. PATENT DOCUMENTS

| | | | |
|---|---|---|---|
| 4,808,690 A * | 2/1989 | Slagel ............................ 528/60 |
| 4,891,271 A * | 1/1990 | Bravet et al. .............. 428/423.1 |
| 5,279,882 A * | 1/1994 | Daude et al. ................. 428/192 |
| 6,093,451 A | 7/2000 | Sandlin et al. ............ 427/423.1 |
| 6,894,084 B2 * | 5/2005 | Kovar et al. ................. 522/150 |
| 2004/0087745 A1 | 5/2004 | Sukhadia et al. |

FOREIGN PATENT DOCUMENTS

| JP | 6198703 | 7/1994 |
| WO | WO99/39906 | 8/1999 |
| WO | WO2006/034346 | 3/2006 |

* cited by examiner

# WINDOW INTERLAYER WITH SOUND ATTENUATION PROPERTIES

CROSS-REFERENCE TO RELATED APPLICATIONS

This application is related to U.S. application Ser. No. 11/652,749 entitled "Automotive Window Interlayer With Solar Control Properties", U.S. application Ser. No. 11/652,750 entitled "Method For Forming A Laminated Window That Can Exhibit A Variable Level Of Adhesion", U.S. application Ser. No. 11/652,748 entitled "Automotive Window, High Impact Interlayer", all three applications filed concurrently herewith, and all three applications incorporated by reference in their entirety.

FIELD OF THE INVENTION

The present invention is a novel interlayer and a laminated window that contains such interlayer; specifically a laminated window that exhibits improved sound attenuation properties.

BACKGROUND

Laminated windows are made up of multiple plies, e.g. two plies, made of glass, plastic, or glass/plastic substrates that sandwich one or more interlayers. The windows are widely used in automotive front windshields and sidelights. Typically, laminated windows must exhibit one or more of the following properties: (1) high impact energy absorption; (2) shear and tear strength sufficient to prevent rupture of the interlayer by broken glass; (3) sufficient adhesion between the interlayer and the glass to prevent dispersion of broken glass; and (4) good optical qualities.

Depending on the vehicle and the application, a laminated window may need to exhibit additional properties such as, but not limited to, (a) resistance to ballistics, blast, and wind pressures, (b) sound reduction and/or (c) solar control properties. One of the conventional ways for changing the properties of a laminated window is to modify the composition and/or configuration of the interlayer(s).

Conventionally, laminated windows have a polyvinylbutyral (PVB) interlayer that includes various plasticizers. Different plasticizers are added to the PVB to change the properties of the interlayer.

One of the drawbacks of a laminated window having a PVB interlayer is cost. In order to be formed into a sheet that can be used as an interlayer in a laminated window, PVB must first be extruded. Extrusion is the process of converting plastic pellets into cut-to-size sheets of plastic using specialized equipment that subjects the pellets to both heat and pressure. Extrusion can be an expensive process.

It would be desirable to have a laminated window that includes an interlayer that can be formed via a non-extrusion process, such as a cast-in-place process or a reaction injection molding (RIM) process. The present invention provides such an interlayer. The interlayer of the present invention comprises a polyurethane material that can be incorporated into a laminated window. The laminated window of the present invention exhibits good sound attenuation properties.

SUMMARY OF THE INVENTION

In a non-limiting embodiment, the present invention is a method of making a polyurethane material comprising: a) reacting the following components to form a reaction mixture: (1) at least one chain extender; (2) at least one polyether polyol having a molecular weight of approximately 1,000; and (3) at least one aliphatic polyisocyanate; and b) curing the reaction mixture.

In another non-limiting embodiment, the present invention is a method for forming a laminated window comprising: a) assembling a mold comprising two plies that make up a laminated window, the plies being a predetermined distance apart; b) filling the mold with a reaction mixture comprising: (1) at least one chain extender; (2) at least one polyether polyol having a molecular weight of approximately 1,000; and (3) at least one aliphatic polyisocyanate, and; c) curing the reaction mixture.

In yet another non-limiting embodiment, the present invention is a laminated window, comprising; a first and a second transparent ply; and an interlayer positioned between the first and the second plies, the interlayer being a reaction product of: (1) at least one chain extender; (2) at least one polyether polyol having a molecular weight of approximately 1,000; and (3) at least one aliphatic polyisocyanate.

DETAILED DESCRIPTION OF THE INVENTION

Figure 1:
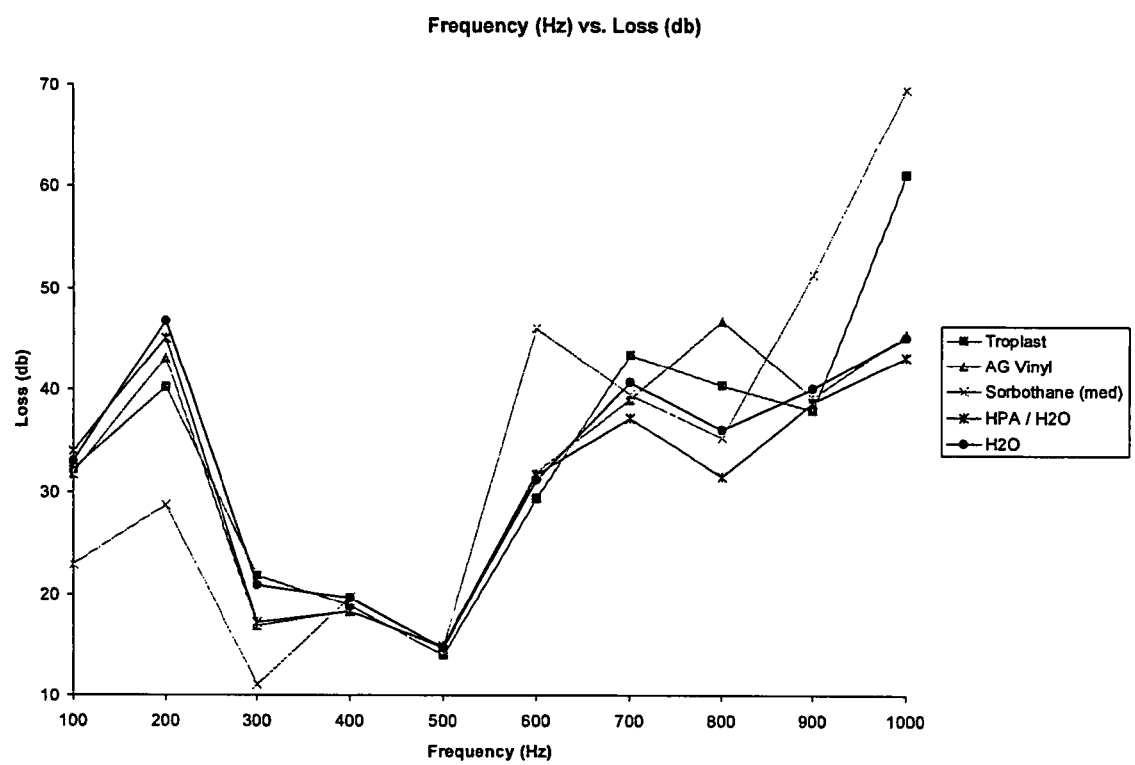
FIG. 1 is the plot of the sound attenuation properties of various laminated windows made up of different interlayers over a frequency of 100 Hz to 1,000 Hz at a temperature of 72° F. (22.2° C.)

All numbers expressing dimensions, physical characteristics, quantities of ingredients, reaction conditions, and the like used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive on the minimum value of 1 and the maximum value of 10; that is, all subranges beginning with a minimum value of 1 or more and ending with a maximum value of 10 or less, e.g., 1.0 to 7.8, 3.0 to 4.5, and 6.3 to 10.0.

As used herein, spatial or directional terms, such as "left", "right", "inner", "outer", "above", "below", "top", "bottom", and the like, are understood to encompass various alternative orientations and, accordingly, such terms are not to be considered as limiting.

The present invention is a method of making a novel polyurethane material that can be formed into an interlayer for a laminated window. The polyurethane material can be a polycarbonate based polyurethane, a polyester based polyurethane, a polyether based polyurethane or blends thereof.

According to the present invention, the first step in making the polyurethane material involves reacting the following components to form a reaction mixture:

(1) at least one chain extender;
(2) at least one polyether polyol having a molecular weight of approximately 1,000; and
(3) at least one aliphatic polyisocyanate.

According to the present invention, suitable chain extenders include, but are not limited to, ethylene glycol; 1,2- or 1,3-propanediol; 1,2-, 1,3- or 1,4-butanediol; 2-methylpropane diol, 1,2-, 1,3-, 1,4- or 1,5-pentanediol, and mixtures thereof.

According to the present invention, suitable polyether polyols include polyethers with caprolactones, as are marketed, for example, under the name poly-THF by BASF AG (Germany), as well as organo functional polydimethyl siloxanes.

According to the present invention, suitable aliphatic polyisocyanate include diisocyanates and triisocyanates. Examples of suitable aliphatic diisocyanates include, but are not limited to, monomeric diisocyanates such as bis(4-isocyanato-cyclohexyl)methane, which is commercially available from Bayer Corporation (Pittsburgh, Pa.) as DESMODUR® W; hexamethylene diisocyanate; 4,4-bis(cyclohexyl)methane diisocyanate; isophorone diisocyanate; 1-methylcyclohexame-2,4-diisocyanate; and trimethyl hexamethylene diisocyanate (TMDI). A suitable aliphatic triisocyanate includes, but is not limited to 4,4',4"-tricyclohexylmethane triisocyanate.

In a non-limiting embodiment of the invention, the polyurethane material that is formed in the step described above has a weight percent of urethane ranging from 8 to 14 percent and a molecular weight per crosslinker ranging from 0 to 10,000.

In a non-limiting embodiment of the present invention, the materials above are reacted in the equivalent ranges shown in Table 1.

TABLE 1

Equivalent ranges of reacted materials

| Component | Equivalent Range |
| --- | --- |
| (1) chain extender | 1.0 |
| (2) polyether polyol having a molecular weight of approximately 1,000 | 0.5-1.0 |
| (3) aliphatic polyisocyanate | 1.0 |

The reaction conditions are typical of the conditions used to synthesize polyurethane materials as is well known in the art.

In various non-limiting embodiments, optional materials can be added to the reaction mixture described above. In one non-limiting embodiment, the reaction mixture comprises a polyester polyol having a molecular weight of approximately 300. A suitable polyester polyol having a molecular weight of approximately 300 includes a polyester polyol supplied by Union Carbide, (Danbury, Conn.) as Tone 0301. According to the present invention, the polyester polyol can be present in the reaction mixture in an equivalent range ranging up to 0.5.

In another non-limiting embodiment, the reaction mixture comprises an elastomer crosslinker such as trimethylolpropane (TMP).

In a non-limiting embodiment of the invention, dyes can be added to the reaction mixture for making the polyurethane to influence the color of the interlayer. The dyes simply dissolve in the reaction mixture. Suitable dyes include, but are not limited to, nanopigments, ultraviolet (UV) light stable organo tungsten dyes, etc, and mixtures thereof. Depending on the dye(s) used, the interlayer can exhibit one of the following colors: blue, green, red, yellow, pink, etc.

In another non-limiting embodiment of the invention, the dyes are not added to the reaction mixture for making the polyurethane. They are added at a later time, for example, after the reaction mixture is cured as described below. The dyes simply dissolve into the cured material.

In a non-limiting embodiment, the dye is an organo tungsten dye prepared by reacting tungsten hexachloride with an alkyl ester of phosphoric acid. In order to prepare the dye, one mole of tungsten hexachloride is reacted with 3 or more moles of an alkyl ester of phosphoric acid. The organo tungsten dye provides a grayish-blue color to an interlayer.

In a non-limiting embodiment, the reaction mixture can include from 2% to 25% by weight of the reaction mixture of a material that contains functional groups cable of being cured by exposure to UV light such as, but not limited to, urethane acrylate or hydroxyethyl acrylate, propyl acrylate and mixtures thereof. Such compounds will be beneficial in the curing step described below, especially if UV curing is utilized.

In various non-limiting embodiments of the invention, one or more catalysts can be added to the reaction mixture. Suitable catalysts include UV catalysts, for example, diphenyl (2,4,6 trimethyl) benzoyl phosphine oxide, and thermal catalysts such as dibutyltin dilaurate and butyl stannoic acid.

According to the present invention, a next step in making the polyurethane material involves curing the reaction mixture. The composition can be cured by thermal curing, curing using UV light, or a combination of thermal and UV curing.

In a non-limiting embodiment, the composition is cured by a combination of thermal and UV curing. In this embodiment, the mixture is UV cured first. For example, the reaction mixture can be exposed to an UV light source for a period ranging from 30 seconds to 2 minutes. After the mixture has been exposed to UV light, it is thermally cured. For example, the mixture is thermally cured by placing it in an oven and heating it at a temperature ranging from 180° F. to 290° F. (82° C. to 143° C.) for a period ranging from 15 minutes and 2 hours.

As used herein, UV light cure refers to exposing the material to wavelengths between 220-450 nm of the electromagnetic spectrum. Suitable sources of ultraviolet radiation include natural sources, like solar radiation, and artificial sources like black light or an ultraviolet light source.

In a non-limiting embodiment, the mixture is thermally cured. For example, the mixture is thermally cured by placing it in an oven and heating it at a temperature ranging from 180° F. to 290° F. (82° C. to 143° C.) for a period ranging from 15 minutes and 2 hours.

The present invention also encompasses a method for forming a laminated window having an interlayer comprising the polyurethane material described above sandwiched between two transparent plies. Typically, the plies are glass, plastic or one of each, as is well known in the art.

According to the present invention, the polyurethane interlayer is made at the same time the laminated window is being made. In this embodiment, the polyurethane interlayer is made via a casting or reaction injection molding (RIM) process as is well known in the art. The first step in the method of forming the laminated window of the invention comprises assembling a mold (also referred to as a "cast" in the art) between the two plies that will make up the laminated window. The cast can be made of any materials and in any way known in the art. In a non-limiting embodiment of the invention, the cast comprises the two plies that are spaced apart at a predetermined distance equal to the desired thickness of the interlayer.

According to the present invention, a next step in the method for forming the laminated window involves filling the cast with the reaction mixture for making the polyurethane material as described above. In a non-limiting embodiment, the filling step comprises pouring or pumping at least partially uncured polyurethane material into the cast.

The composition of the reaction mixture can be changed to control the sound attenuation properties of the interlayer of the present invention. The sound attenuation properties of the material are directly related to the stiffness of the material used to make the interlayer. The stiffness of the material used to make the interlayer is directly related to the glass transition temperature of the material.

In a manner that is well known in the art, the amount of one or more materials present in the reaction mixture as described above can be adjusted to provide a polyurethane material having a glass transition temperature ranging from −35° C. to 200° C. (−31° F. to 392° F.). A stiffer polyurethane interlayer material can be obtained by increasing the glass transition temperature of the polyurethane material. Conversely, a less stiff polyurethane interlayer material can be obtained by decreasing the glass transition temperature of the polyurethane material. Stiffer interlayer materials attenuate lower frequency sound waves. Less stiff interlayer materials attenuate higher frequency sound waves. Stiffer polymeric materials would have a Young's Modulus range of 300,000 to 600,000 pounds per square inch, whereas softer materials would have a Young's Modulus of 100,000 pounds per square inch to 280,000 pounds per square inch. The frequency absorption is a complex phenomenon which is dependent on many material properties, as sound can be absorbed or reflected and is also dependent on density. In general, the higher the Young's Modulus the higher the density. The higher the density the lower the frequency that can be damped. All materials also have a resonance frequency at which sound waves pass through. For example, sound at around 500 hz frequency will pass through glass.

Every interlayer material will exhibit sound attenuation properties that vary with temperature (i.e., depending on the temperature, the sound waves that a interlayer material will attenuate are different). Similar to the above, the composition of the reaction mixture can be varied to affect the variance of the sound attenuation properties of the interlayer material with temperature. Also, multiple interlayers having different attenuation properties can be used to optimize the sound attenuation exhibited by the combination of interlayers at various temperatures.

According to the present invention, a next step in the method for forming a laminated window involves curing the reaction mixture. The curing step is accomplished in the manner described above.

In a non-limiting embodiment, the interlayer of the invention is in the form of a sheet having a thickness ranging from 30 mils to 1 inch (0.076 cm to 2.54 cm). Thinner and thicker sheets can be used depending upon the application.

The present invention also encompasses a laminated window formed from the method described above. In a non-limiting embodiment of the invention, the laminated window comprises more than one interlayer. The laminated window of the present invention can be used in various automotive, architectural and aerospace applications. For example, the laminated window can be used as an automotive windshield, an automotive sidelight, an aircraft window, storefront display windows, sky lights, etc.

When the laminated window of the present invention is used in an automotive and airplane window, it may need to meet certain performance requirements.

In a non-limiting embodiment, a laminate incorporating the interlayer of the present invention exhibits a visible light transmittance ranging from 70% to 90% and no greater than 0.5% haze as measured by a haze-gloss meter sold by BYK-Gardner USA (Columbia, Md.). The interlayer should also exhibit consistent mechanical properties up to a temperature of 180° F. (82° C.).

In certain instances, a laminated window must exhibit a certain level of adhesion, for example, when the laminated window is used as an automotive windshield in the United States. In a non-limiting embodiment, the degree of adhesion exhibited by the laminated window ranges from 1 pound to 10 pounds per lineal inch ($1.75 \times 10^2$ N/m to $1.75 \times 10^3$ N/m) as determined by a 90° Peel Test according to NASA TECH BRIEF 65-10173. This level of adhesion is low enough to allow sufficient interlayer to release from the glass so that it can stretch without tearing to absorb impacting energy. Further, this level of adhesion is high enough to sufficiently retain any broken glass. Higher degrees of adhesion, that is, much higher than 10 pounds per lineal inch ($1.75 \times 10^3$ N/m), results in decreases in impact resistance and higher severity indices, as will be described later.

When a laminated window is subject to adhesion requirements, not only must it exhibit an initial degree of adhesion within a prescribed range, the degree of adhesion should also be relatively stable under a wide range of temperature and humidity conditions. By relatively stable under a wide range of temperature and humidity conditions, it is meant that although there may be fluctuations in the adhesive value over a period of time, the degree of adhesion as determined by NASA TECH BRIEF 65-10173 remains within 1 pound to 10 pounds per lineal inch ($1.75 \times 10^2$ N/m to $1.75 \times 10^3$ N/m) after exposure to temperatures ranging from −50° F. to 120° F. (46° C. to 49° C.) and relative humidity at 100% for at least 5 days.

In order to produce a laminated window that exhibits the required level of adhesion, various adhesion promoters and/or adhesion inhibitors can be included in the reaction mixture. In this way, a desirable level of adhesion is provided initially and that level of adhesion is maintained under various conditions, such as extremely high humidity conditions. According to the present invention, suitable adhesion promoters include, but are not limited to, alkoxy silanes, such as glycidyl-oxypropyltrimethoxy silane sold by the Dow Corning Company (Midland, Mich.) under the trademark Z-6040®, and gamma-glycidoxy propyltrimethoxy silane. In a non-limiting embodiment, the adhesion promoter is present in a concentration ranging from 0.05 to 0.12 percent by weight of the reaction mixture.

In a non-limiting embodiment of the present invention, where the adhesive properties of reaction mixture are too high, adhesive inhibitors can be used.

According to the present invention, a suitable adhesion inhibitor is stearyl acid phosphate. In a non-limiting embodiment, the adhesion inhibitor is present in a concentration ranging from 0.05 to 0.12 percent by weight of the reaction mixture.

The laminated window of the present invention may exhibit good sound attenuation properties. The interlayer effectively dampens sound waves above 1,000 Hz by from 1 to 6 decibels. The glass transition temperature is the maximum in mechanical damping which is termed tan delta and is determined by running Dynamic Mechanical Analysis (DMA). DMA is a technique in which a material is vibrated at 1 Hz or greater and the storage, loss modulus, and tan delta are measured over a wide temperature range. At the glass transition temperature, maximum damping of the vibration occurs, which is the temperature at which the material converts mechanical energy into heat most effectively.

EXAMPLES

The present invention is illustrated by the following non-limiting examples. All of the examples were prepared at around 2 mm of pressure, i.e., under vacuum or degassing conditions.

Example 1

Example 1 was made in the following manner. 7.8 grams of 1,5 pentanediol, 550 grams of polytetramethylene oxide polyol, 14.6 grams of Tone 0301(Union Carbide), and 183 grams of DESMODUR® W were mixed together in a 3 liter glass kettle at room temperature. The kettle was then heated to a temperature of 180° F. (82° C.). Next, 0.05% of A-1310 isocyanate functional silane was added as an adhesion promoter, and 50 ppm of dibutyltin dilaurate was added as a catalyst.

The mixture was degassed and poured between 2 plies of 2 mm clear glass to form a laminated window having an interlayer. The laminated window was placed in an oven and cured at 250° F. (121° C.) for 4 hours and then cooled to room temperature. The polyurethane interlayer material had a weight % urethane content of 10.9% and a glass transition temperature of −35° F. (−37).

Example 2

Example 2 was made in the following manner. 64.9 grams of 1,5 pentanediol, 83.7 grams of polytetramethylene oxide polyol, 194.59 grams of DESMODUR® W, 6.76 grams of Tone 0301, 0.05% of A-1310 isocyanate functional silane, and 50 ppm of dibutyltin dilaurate were mixed together in a 3 liter glass kettle at room temperature. The kettle was then heated to a temperature of 180° F. (82° C.).

Next, the mixture was degassed and poured between 2 plies of 2 mm clear glass to form a laminated window having an interlayer. The laminated window was placed in an oven for 4 hours at 250° F. (121° C.) and then cooled to room temperature. The polyurethane interlayer material had a weight % urethane content of 25.0% and a glass transition temperature of 90° F. (32° C.).

Figure 2:
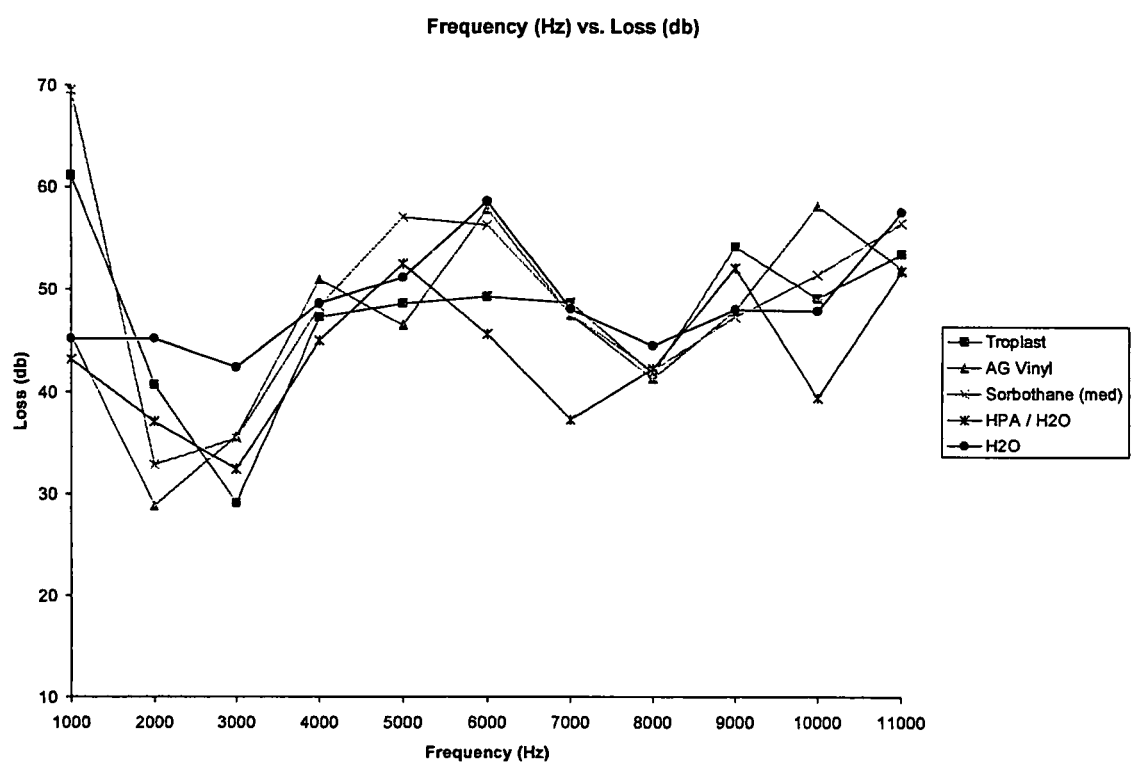
FIG. 2 is the plot of the sound attenuation properties of various laminated windows made up of different interlayers over a frequency of 1,000 Hz to 11,000 Hz at a temperature of 72° F. (22.2° C.).

The sound attenuation properties of various laminated windows having different interlayers are shown in FIGS. 1 and 2 below. The sound attenuation was measured by a Monarch Instrument OEL-430 sound level meter. The laminated windows made with PVB were autoclaved for 2 hours at 275° F. at 200 psi (135° C. at 1.379 MPa). The laminated windows having urethane interlayers were made by pouring the reaction mixture between 2 plies of 2 mm glass. The reaction mixture was then heated cured in an oven at 250° F. (121° C.) for 12 hours. All laminates were fabricated by casting or pouring the interlayer between 2 plies of glass, following by oven curing.

Below, some terms which are found in the FIGS are defined:

1. "Tropoplast" refers to a laminated window with an interlayer made of Trofosol® acoustic polyvinyl butyral. Trofosol is available from HT Troplast GmbH (Troisdorf, Germany);

2. "AG Vinyl" refers to a laminated window with an interlayer made of PVB commercially available from Solutia (St. Louis, Mo.);

3. "Sorbothane®" refers to a laminated window with an interlayer made of a proprietary, urethane material, commercially available from Sorbothane, Incorporated (Kent, Ohio);

4. "HPA/H$_2$O" refers to a laminated window with an interlayer made of polyhydroxypropylacrylate containing water; and 5. "H$_2$O" refers to a laminated window with an interlayer made of water.

In the FIGS, a sound attenuation of 3 db is considered very good. A 1 db drop is a drop in sound attenuation by a factor of 10. FIGS. 1 and 2 illustrate that the interlayers are better at attenuating high frequencies than low frequencies.

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

We claim:

1. A method of making a polyurethane material comprising:
    a) reacting the following components to form a reaction mixture:
        (1) at least one chain extender;
        (2) at least one polyether polyol having a molecular weight of approximately 1,000; and
        (3) at least one aliphatic polyisocyanate
        wherein the reaction mixture has an OH:NCO ratio that is between 0.89:1 to 0.94:1, and
    b) curing the reaction mixture by exposing the reaction mixture to ultraviolet radiation having a wavelength between 220 and 450 nm, or heating the reaction mixture to a temperature ranging from 180° F. to 290° F.

2. The method according to claim 1, wherein the chain extender is selected from ethylene glycol; 1,2-propanediol; 1,3-propanediol; 1,2-butanediol; 1,3-butanediol; 1,4-butanediol; 2-methylpropane diol; 1,2-pentanediol; 1,3-pentanediol; 1,4-pentanediol; and 1,5-pentanediol.

3. The method according to claim 1, wherein the polyether polyol is selected from polyethers with caprolactones and organo functional polydimethyl siloxanes.

4. The method according to claim 1, wherein the at least one aliphatic polyisocyanate is selected from an aliphatic diisocyanate and an aliphatic triisocyanate.

5. The method according to claim 4, wherein the aliphatic diisocyanate is selected from bis(4-isocyanato-cyclohexyl) methane; hexamethylene diisocyanate; 4,4-bis(cyclohexyl) methane diisocyanate; isophorone diisocyanate; 1-methylcyclohexane-2,4-diisocyanate; and trimethyl hexamethylene diisocyanate (TMDI).

6. The method according to claim 4, wherein the aliphatic triisocyanate is 4,4',4"-tricyclohexy methane triisocyanate.

7. The method according to claim 1, wherein the reaction mixture comprises between 0.5-1.0 equivalents of the at least one polyether polyol.

8. The method according to claim 1, wherein the reaction mixture further comprises a polyester polyol having a molecular weight of approximately 300 in an amount ranging from greater than 0 to 0.5 equivalents.

9. The method according to claim 1, wherein the reaction mixture further comprises a dye selected from nanopigments, organo tungsten dyes, and mixtures thereof.

10. The method according to claim 9, wherein the dye is an organo tungsten dye prepared by reacting one mole of tungsten hexachloride with 3 or more moles of an alkyl ester of phosphoric acid.

11. The method according to claim 1, wherein the reaction mixture further comprises 2% to 25% by weight of the reaction mixture of urethane acrylate, hydroxyethyl acrylate, and propyl acrylate.

12. The method according to claim 1, wherein the reaction mixture comprises an ultraviolet light catalyst, a thermal catalyst, or both.

13. An interlayer formed by the method of claim 1.

14. A method for increasing sound attenuation in a window comprising:
  a) assembling a mold comprising two plies that make up a laminated window, the plies being a predetermined distance apart;
  b) filling the mold with a reaction mixture comprising:
    (1) at least one chain extender;
    (2) at least one polyether polyol having a molecular weight of approximately 1,000; and
    (3) 1.0 equivalents of at least one aliphatic polyisocyanate
  wherein the reaction mixture has an OH:NCO ratio that is between 0.89:1 and 0.94:1, and
  c) curing the reaction mixture by exposing the reaction mixture to ultraviolet radiation having a wavelength between 220 and 450 nm, or heating the reaction mixture to a temperature ranging from 180° F. to 290° F.

15. The method according to claim 14, wherein the curing step comprises thermal curing, ultraviolet light curing, or both.

16. The method according to claim 14, wherein the reaction mixture forms an interlayer being a sheet having a thickness ranging from 30 mils to 1 inch.

17. The method according to claim 14, wherein the laminated window attenuates sound waves having a frequency of 1000 Hz and above.

18. The method according to claim 14, wherein the laminated window exhibits a degree of adhesion ranging from 1 pound to 10 pounds per lineal inch ($1.75 \times 10^2$ N/m to $1.75 \times 10^3$ N/m) as determined by a 90° Peel Test according to NASA TECH BRIEF 65-10173.

19. The method according to claim 14, wherein the at least one aliphatic polyisocyanate is 4,4',4"-tricyclohexy methane triisocyanate.

20. The method according to claim 14, wherein the reaction mixture further comprises a polyester polyol having a molecular weight of approximately 300 in an amount ranging from greater than 0 to 0.5 equivalents.

21. The method according to claim 1, wherein the reaction mixture further comprises an adhesion promoter.

22. The method according to claim 21, wherein the adhesion promoter is an isocyanate functional silane.

23. The method according to claim 21, wherein the reaction mixture further comprises a catalyst.

24. The method according to claim 23, wherein the catalyst is dibutyltin dilaurate.

25. A method of making a polyurethane material comprising:
  a) reacting at least one polyether polyol having a molecular weight of approximately 1,000 with at least one aliphatic polyisocyanate, thereby forming a prepolymer mixture;
  b) reacting the prepolymer mixture with x equivalents of at least one chain extender, thereby forming a reaction mixture, and
  c) curing the reaction mixture,
wherein the method comprising reacting a ratio of OH:NCO that is between 0.89:1 and 0.94:1.

* * * * *